United States Patent [19]

Blackburn

[11] Patent Number: 5,783,916
[45] Date of Patent: Jul. 21, 1998

[54] APPARATUS AND METHOD FOR GENERATING ROTOR POSITION SIGNALS AND CONTROLLING COMMUTATION IN A VARIABLE RELUCTANCE ELECTRIC MOTOR

[75] Inventor: Scott E. Blackburn, Temperance, Mich.

[73] Assignee: Dana Corporation, Toledo, Ohio

[21] Appl. No.: 674,426

[22] Filed: Jul. 2, 1996

[51] Int. Cl.$^6$ ................................................ H02P 7/00
[52] U.S. Cl. ........................................ 318/254; 318/701
[58] Field of Search .................................. 318/254, 439, 318/138, 701

[56] References Cited

U.S. PATENT DOCUMENTS

| | | |
|---|---|---|
| 3,980,933 | 9/1976 | Piatowski, Jr. |
| 4,136,308 | 1/1979 | King |
| 4,234,838 | 11/1980 | Langley et al. |
| 4,520,302 | 5/1985 | Hill et al. |
| 4,563,619 | 1/1986 | Davis et al. |
| 4,777,419 | 10/1988 | Obradovic |
| 4,868,478 | 9/1989 | Hedlund et al. |
| 5,043,643 | 8/1991 | Hedlund et al. |
| 5,097,190 | 3/1992 | Lyons et al. |
| 5,144,215 | 9/1992 | Bahn |
| 5,166,591 | 11/1992 | Stephens et al. |

OTHER PUBLICATIONS

"Detection Of Rotor Position In Stepping And Switched Motors By Monitoring Of Current Waveforms", IEEE, pp. 215–222 (1985).

"Application Of Sensor Integration Techniques To Switched Reluctance Motor Drives", IEEE (1988).

"A Simple Motion Estimator For Variable–Reluctance Motors", IEEE, pp. 237–243 (1990).

Primary Examiner—Jonathan Wysocki
Attorney, Agent, or Firm—MacMillan, Sobanski & Todd, LLC

[57] ABSTRACT

An apparatus and method for generating electrical signals which are representative of the rotational position of a rotor relative to a stator and for controlling commutation in a variable reluctance electric motor includes a circuit for generating relatively small pulses of electrical current to a non-energized stator winding of the motor. As the rotor rotates relative to the stator, the inductance induced in such stator winding will vary. As a result, the magnitude of the current pulses in the stator winding will increase over time. When the magnitude of such current pulses exceeds a predetermined threshold level corresponding to a predetermined relative rotational position of the rotor, a signal is generated to cause commutation of the motor. Variations in the inductances of the stator windings are compensated for by providing maximum and minimum voltage detector and hold circuits which are responsive to the output signals from the sample and hold circuit. By generating the threshold level as a function of the maximum and minimum signals, such as by a resistive voltage divider network, compensation is made for these variations in inductance. The above functions can be accomplished by a simple and inexpensive logic circuit.

17 Claims, 8 Drawing Sheets

APPARATUS AND METHOD FOR GENERATING ROTOR POSITION SIGNALS AND CONTROLLING COMMUTATION IN A VARIABLE RELUCTANCE ELECTRIC MOTOR

BACKGROUND OF THE INVENTION

This invention relates in general to electric motors and in particular to a apparatus and method for generating electrical signals which are representative of the rotational position of a rotor relative to a stator in a variable reluctance electric motor and for controlling commutation of the motor in response thereto.

Electric motors are well known devices which convert electrical energy to rotary mechanical energy. To accomplish this, electric motors establish and control electromagnetic fields so as to cause the desired rotary mechanical motion. There are many different types of electric motors, each utilizing different means for establishing and controlling these electromagnetic fields. Consequently, the operating characteristics of electric motors vary from type to type, and certain types of electric motors are better suited for performing certain tasks than others.

Synchronous motors constitute one principal class of electric motors. The two basic components of a synchronous motor are (1) a stationary member which generates a rotating electromagnetic field, generally referred to as the stator, and (2) a rotatable member driven by the rotating magnetic field, generally referred to as the rotor. Synchronous motors are characterized in that the rotational speed of the rotor is directly related to the frequency of the electrical input signal applied thereto and, therefore, the rotational speed of the electromagnetic field generated thereby. Thus, so long as the frequency of the applied electrical input signal is constant, the rotor will be driven at a constant rotational speed. Within this broad definition, however, the structure and operation of synchronous electric motors vary widely.

One variety of synchronous electric motor is a variable reluctance motor. Variable reluctance motors operate on the principle that a magnetic field which is created about a component formed from a magnetically permeable material will exert a mechanical force on that component. This mechanical force will urge the component to become aligned with the magnetic flux (lines of force) generated by the magnetic field. Thus, by using the stator to establish and rotate a magnetic field about a rotor formed from a magnetically permeable material, the rotor can be driven to rotate relative to the stator. The resistance to the passage of this magnetic flux from the stator to the rotor is referred to as reluctance. The magnitude of this reluctance changes with the rotational position of the rotor relative to the stator. Thus, electric motors of this type are commonly referred to as variable reluctance motors.

In a conventional variable reluctance motor, the stator is generally hollow and cylindrical in shape, having a plurality of radially inwardly extending poles which extend longitudinally throughout the length thereof. Similarly, the rotor is generally cylindrical in shape, having a plurality of radially outwardly extending poles which extend longitudinally throughout the length thereof. The stator and the rotor are both formed from a magnetically permeable material. A winding of an electrical conductor is provided about each of the stator poles. By passing pulses of electrical current through each of the stator windings in a sequential manner, the stator poles can be selectively magnetized so as to attract the rotor poles thereto. Consequently, the rotor will rotate relative to the stator. Depending upon the frequency of the sequential energization of the stator windings, the rotor may be caused to rotate in a step-like manner. Because of this sequential switching of the electrical current through the stator windings, electric motors of this type are also commonly referred to as switched reluctance motors.

The switching of the electrical current through the stator windings is usually accomplished by a commutation circuit which is adapted to selectively generate pulses of electrical current through each of the stator windings so as to cause the rotor to rotate relative to the stator. The timing, magnitude, and polarity of the electrical current pulses generated by the commutation circuit is often determined, at least in part, by the rotational position of the rotor relative to the stator. For example, the current pulses generated to a first stator winding on a particular stator pole can be initially increased to a maximum magnitude, then gradually decreased as the current pulse generated to a second winding is gradually increased. This is done to permit a smooth transition of a rotor pole past an attracting stator pole, allowing the rotor to rotate at a relatively constant speed without stuttering movement from phase to phase. Also, rotor position sensing is essential whenever closed loop control of the motor is desired. In these situations, some means must be provided for generating an electrical signal to the commutation circuit which is representative of the rotational position of the rotor relative to the stator.

A number of rotor position sensing structures are known in the art. For example, it is known to use external devices, such as optical encoders and Hall effect sensors, to generate the electrical rotor position signals. Unfortunately, known external devices are relatively complex and expensive and, therefore, add undesirable cost to the motor. Also, external devices can undesirably increase the physical space required to house the motor. It is also known to use internal electronic sensing circuits to generate the electrical rotor position signals. However, it has been found that known internal electronic circuits suffer from inaccuracies resulting from variations in the inductance and resistance of the stator windings from one phase of the motor to another, and also from one motor to another. Additionally, temperature changes can introduce further variations in these parameters. Lastly, known internal electronic circuits rely upon relatively expensive microprocessors to acquire and evaluate all of the data used to generate the rotor position signals. Thus, it would be desirable to provide an apparatus and method for generating rotor position signals for use by the commutation circuit which is simple and inexpensive in structure and operation, and which further can account for variations in the inductance and resistance of the stator windings.

SUMMARY OF THE INVENTION

This invention relates to an apparatus and method for generating electrical signals which are representative of the rotational position of a rotor relative to a stator in a variable reluctance electric motor and for controlling commutation of the motor in response thereto. Initially, relatively small pulses of electrical current are generated to a non-energized stator winding of the motor. As the rotor rotates relative to the stator, the inductance induced in such stator winding will vary. As a result, the magnitude of the current pulses in the stator winding will increase over time. When the magnitude of such current pulses exceeds a predetermined threshold level corresponding to a predetermined relative rotational position of the rotor, a signal is generated to cause commutation of the motor. Variations in the inductances of the stator windings are compensated for by providing maximum and minimum voltage detector and hold circuits which are responsive to the output signals from the sample and hold circuit. By generating the threshold level as a function of the maximum and minimum signals, such as by a resistive voltage divider network, compensation is made for these variations in inductance. The above functions can be accomplished by a simple and inexpensive logic circuit.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
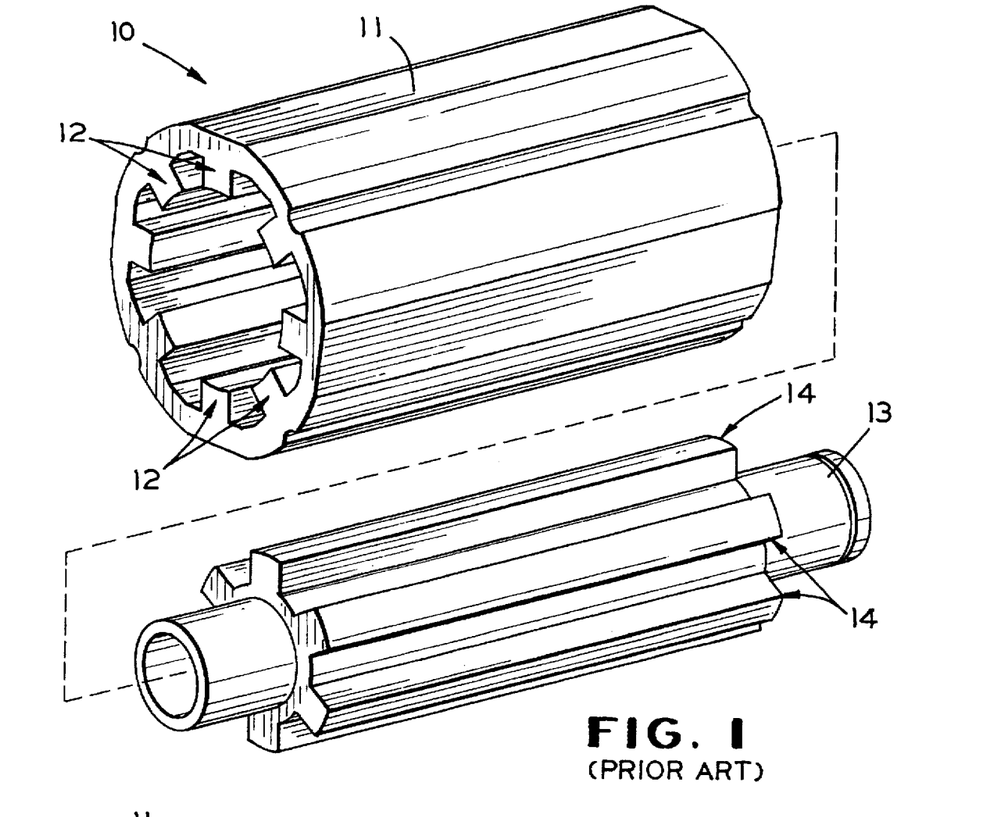
FIG. 1 is an exploded perspective view of a portion of a variable reluctance electric motor in accordance with this invention.
Figure 2:
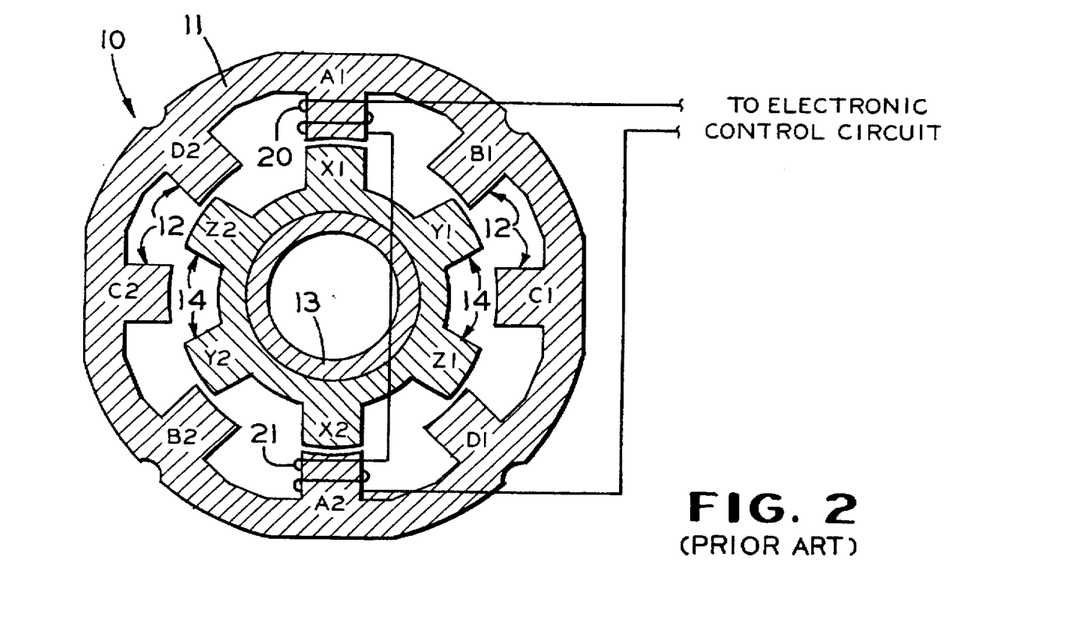
FIG. 2 is a sectional elevational view of the variable reluctance electric motor illustrated in FIG. 1 shown assembled, together with schematically illustrated portions of two of the opposed stator windings which constitute one phase for operating the motor.

Referring now to the drawings, there is illustrated in FIGS. 1 and 2 a portion of a variable reluctance electric motor, indicated generally at 10, in accordance with this invention. The motor 10 includes a stator 11 which is generally hollow and cylindrical in shape. A plurality of radially inwardly extending poles, indicated generally at 12, are formed on the stator 11 and extend longitudinally throughout the length thereof. The stator poles 12 are preferably provided in opposed pairs, such as shown in FIG. 2 at A1 and A2, B1 and B2, C1 and C2, and D1 and D2. Thus, eight stator poles 12 are provided on the illustrated stator 11. However, it is known in the art to provide the stator 11 with either a greater or lesser number of stator poles 12.

Each of the stator poles 12 is generally rectangular in cross sectional shape. The radially innermost surfaces of the stator poles 12 are slightly curved so as to define an inner diameter. However, the stator poles 12 may be formed having any desired cross sectional shape. The stator 11 and the stator poles 12 are formed from a magnetically permeable material, such as iron. As will be explained below, each of the stator pole pairs A1 and A2, B1 and B2, C1 and C2, and D1 and D2 represents one phase for energizing the variable reluctance motor 10 for operation. Thus, the illustrated motor 10 has four electrical phases for energization. However, the number of electrical phases may be greater or lesser than as illustrated.

A cylindrical rotor 13 is co-axially supported within the stator 11 for relative rotational movement. The rotor 13 has a plurality of radially outwardly extending poles, indicated generally at 14, formed thereon. As with the stator poles 12, the rotor poles 14 extend longitudinally throughout the length of the rotor 13 and are preferably provided in opposed pairs, such as shown at X1 and X2, Y1 and Y2, and Z1 and Z2. Thus, six rotor poles 14 are provided on the illustrated rotor 13. However, it is known in the art to provide the rotor 13 with either a greater or lesser number of rotor poles 14. Generally, the number of rotor poles 14 is different from the number of stator poles 12.

Each of the rotor poles 14 is generally rectangular in cross sectional shape. The radially outermost surfaces of the rotor poles 14 are slightly curved so as to define an outer diameter. However, the rotor poles 14 may also be formed having any desired cross sectional shape. The outer diameter defined by the rotor poles 14 is preferably only slightly smaller than the inner diameter defined by the stator poles 12. Thus, a small radial gap is defined between the inner ends of the stator poles 12 and the outer ends of the rotor poles 14 when they are radially aligned, such as shown in FIG. 2 with the poles A1 and X1 and with the opposed poles A2 and X2. The rotor 13 and the rotor poles 14 are also formed from a magnetically permeable material, such as iron. If desired, the inner ends of the stator poles 12 and the outer ends of the rotor poles 14 may be formed having pluralities of relatively small teeth (not shown) formed thereon.

An electrical conductor is wound about each of the stator poles 12. As schematically shown in FIG. 2, a first pair of windings 20 and 21 are provided on the opposed stator poles A1 and A2, respectively. Similarly, a second pair of windings 22 and 23 (see FIG. 3) are provided on the opposed stator poles B1 and B2, respectively. Also, a third pair of windings 24 and 25 (see FIG. 3) are provided on the opposed stator poles C1 and C2, respectively. Lastly, a fourth pair of windings 26 and 27 (see FIG. 3) are provided on the opposed stator poles D1 and D2, respectively. Electrical current is selectively supplied through the windings 20 through 27 so as to cause the rotor 13 to rotate relative to the stator 11. When electrical current is supplied to the windings 20 and 21, both the stator 11 and the rotor 13 become magnetized. The windings 20 and 21 are oppositely wound such that stator pole A1 (upon which the winding 20 is disposed) is energized to become a magnetic north pole, while the stator pole A2 (upon which the winding 21 is disposed) is energized become a magnetic south pole. As a result, a magnetic circuit is created between these opposed stator poles A1 and A2. Consequently, magnetic flux (lines of force) are created between the north stator pole A1 and the south stator pole A2. The magnetic flux passes from the north stator pole A1 through the nearest rotor pole X1, through the body of the rotor 13, and from the opposed rotor pole X2 to the south stator pole A2. The magnetic circuit between the north and south stator poles A1 and A2 is completed through the outer annular portion of the stator 11.

The resistance to the passage of magnetic flux from the north stator pole A1 to the nearest rotor pole X1 (and similarly from the south stator pole A2 to the nearest rotor pole X2) is referred to as reluctance, as discussed above. The magnitude of this reluctance changes with the rotational position of the rotor poles 14 relative to the stator poles 12. Reluctance is at a minimum when the rotor poles 14 are radially aligned with the stator poles 12, as with A1, X1 and A2, X2 in FIG. 2. Consequently, the generation of the magnetic circuit described above produces a torque which tends to align the opposed rotor poles X1 and X2 with the energized opposed stator poles A1 and A2, as shown in FIG. 2.

To effect rotation of the rotor 13 relative to the stator 11, the flow of electrical current to the first pair of windings 20 and 21 on the stator poles A1 and A2 is turned off, and a flow of electrical current to the second pair of windings 22 and 23 on the stator poles B1 and B2 is turned on. As a result, B1 is energized to become a magnetic north pole, and B2 is energized to become a magnetic south pole. Such energization attracts the nearest rotor poles Y1 and Y2 to become aligned with the energized stator poles B1 and B2. Consequently, the rotor 13 is rotated relative to the stator 11. To continue such rotation of the rotor 13, the stator poles B1 and B2 are de-energized, and the stator poles C1 and C2 are energized by passing electrical current through the windings 24 and 25. Thus, the rotor poles Z1 and Z2 are attracted to the stator poles C1 and C2. By sequentially energizing the stator poles 12 in this manner, the rotor poles 14 are sequentially attracted thereto. As a result, the rotor 13 rotates relative to the stator 11 in a direction (counterclockwise in the illustrated embodiment) which is opposite to the direction (clockwise in the illustrated embodiment) in which the stator pole pairs A1 and A2, B1 and B2, C1 and C2, and D1 and D2 are energized.

In the illustrated embodiment, the stator 11 is provided with eight stator poles 12, while the rotor 13 is provided with six rotor poles 14. From the above discussion, it can be seen that each time one of the stator pole pairs A1 and A2, B1 and B2, C1 and C2, and D1 and D2 is energized, the rotor 13 will be rotated fifteen degrees relative to the stator 11. Thus, the stator pole pairs A1 and A2, B1 and B2, C1 and C2, and D1 and D2 must be energized in sequence six times in order to rotate the rotor 13 throughout one complete revolution. Because the rotational speed of the rotor 13 is directly related to the frequency of the current pulses supplied to the stator poles 12, the motor 10 operates as a synchronous motor. By varying the number of stator poles 12 and rotor poles 14, the rotational speed of the rotor 12 can be varied with respect to the frequency of the current pulses supplied to the stator 11. The operation of the variable reluctance motor 10 described thus far is conventional in the art.

Figure 3:
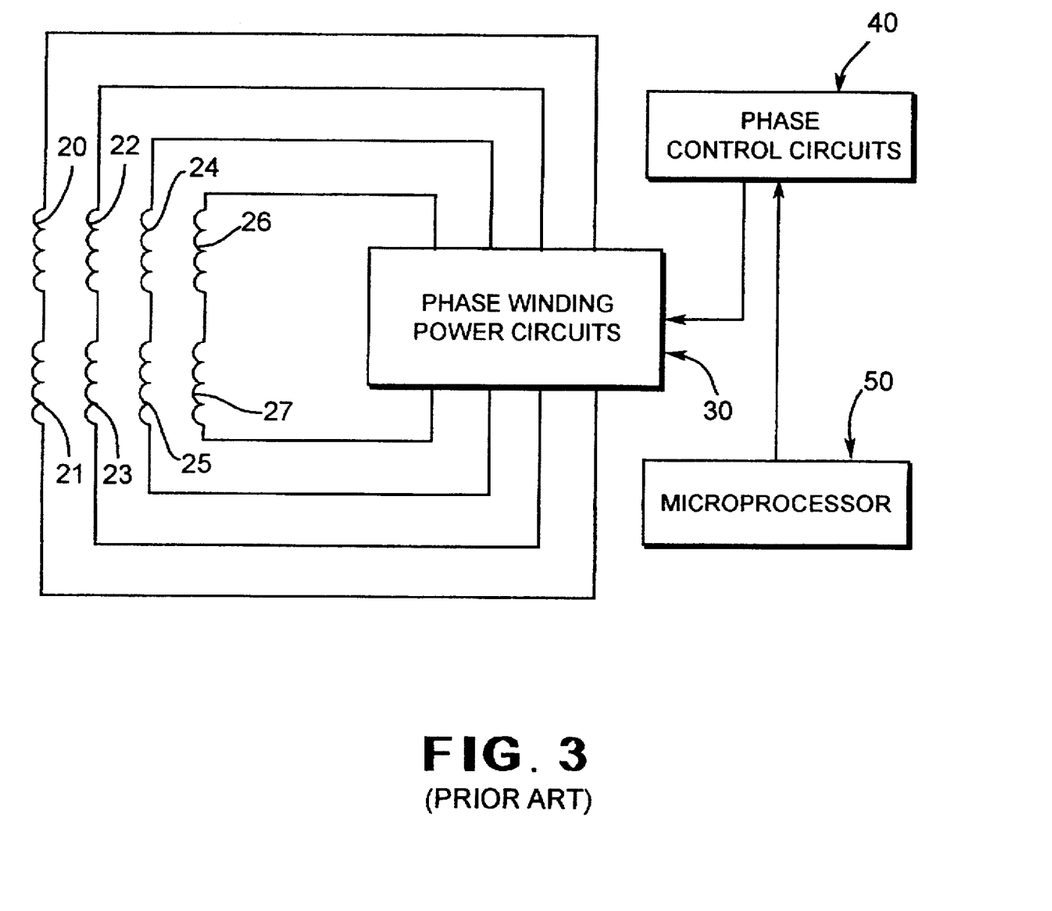
FIG. 3 is a schematic diagram of a prior art structure for an electronic control circuit shown connected to all of the stator windings of the variable reluctance electric motor illustrated in FIGS. 1 and 2.

Referring now to FIG. 3, there is illustrated a schematic diagram of a prior art structure for an electronic control circuit shown for operating the variable reluctance electric motor illustrated in FIGS. 1 and 2. The prior art electronic control circuit a plurality of individual phase winding power circuits, which are indicated generally in a single block at 30. Preferably, an individual phase winding power circuit 30 is provided for each phase of operation of the motor 10. Each of the phase winding power circuits 30 is adapted to selectively generate pulses of electrical current through a selected one of the pairs of stator windings 20 and 21, 22 and 23, 24 and 25, and 26 and 27 in the general manner described above so as to cause the rotor 13 to rotate relative to the stator 11. The structure and operation of the phase winding power circuits 30 will be described in detail below.

The timing, magnitude, and polarity of the electrical current pulses generated by the phase winding power circuits 30 may be determined, at least in part, by the rotational position of the rotor 13 relative to the stator 11. To accomplish this, a plurality of phase control circuits, indicated generally in a single block at 40, is provided. The structure and operation of the phase control circuits 40 will also be described in detail below. The phase winding power circuits 30 are responsive electrical signals generated by the phase control circuits 40 for controlling the timing and magnitude of the current pulses generated to the various pairs of stator windings 20 through 27 of the electric motor 10. Typically, this means that the current pulses generated to a first pair of stator windings on a particular one of the stator poles 12 will be initially increased to a maximum magnitude, then substantially discontinued before the attracted rotor pole 14 is fully aligned therewith. For example, the current pulse generated to the first pair of windings 20 and 21 can be gradually decreased as the current pulse generated to the second pair of windings 22 and 23 is gradually increased. This is done to permit a smooth transition of a rotor pole 14 past an attracting stator pole 12. As a result, the rotor 13 will rotate at a relatively constant speed without stuttering movement from phase to phase.

Finally, the electronic control circuit includes an electronic controller, such as a microprocessor 50 or other computational mechanism. The microprocessor 50 generates electrical signals to the phase control circuit 40 to control the operation thereof and, therefore, the timing, magnitude, and polarity of the electrical current pulses generated by the phase winding power circuits 30. The microprocessor 50 may be embodied as any commercially available microprocessor which is programmed to function in the manner described below.

Figure 4:
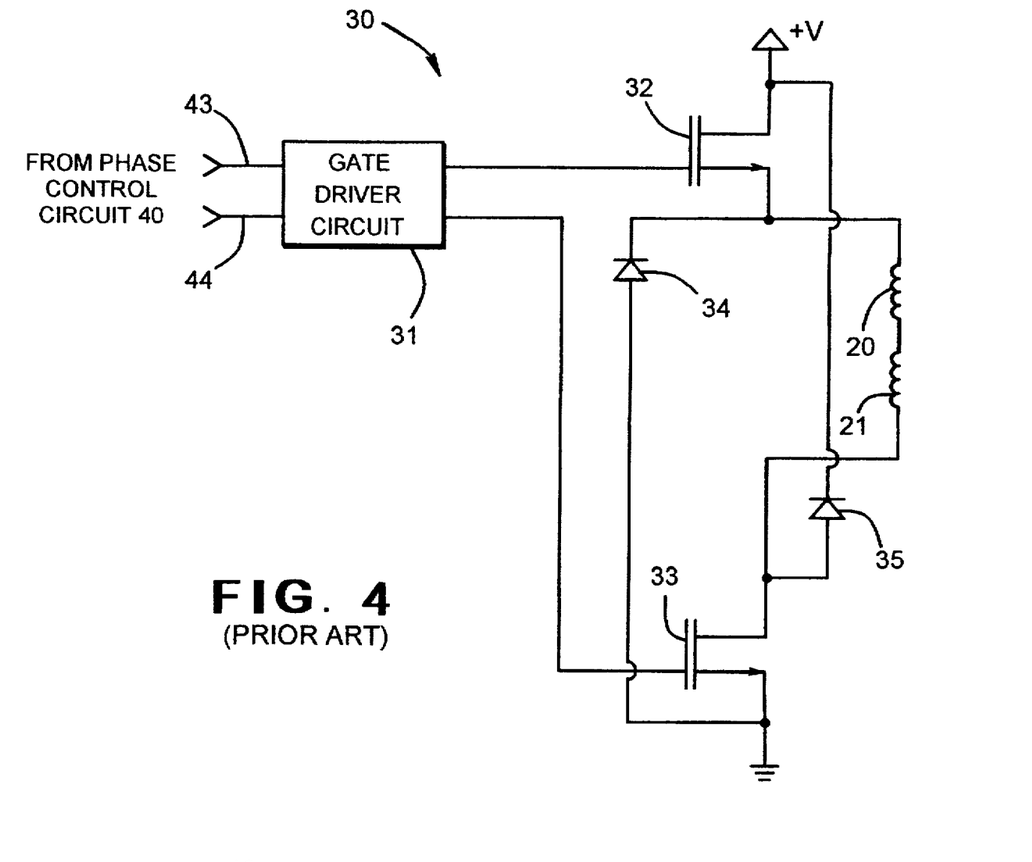
FIG. 4 is a schematic diagram of a prior art structure for one of the phase winding power circuits of the electronic control circuit illustrated in FIG. 3.

FIG. 4 illustrates a prior art structure for the phase winding power circuit 30 connected to the first pair of stator windings 20 and 21. As shown therein, the first phase winding power circuit 30 includes a gate driver circuit 31 which receives input signals from the phase control circuit 40. The gate driver circuit 31 is conventional in the art and is adapted to generate electrical signals to operate first and second electronic switches, such as field effect transistors 32 and 33. In the illustrated embodiment, the gate driver circuit 31 is connected to the gate terminals of the first and second field effect transistors 32 and 33. The drain terminal of the first field effect transistor 32 is connected to a source of electrical energy, such as a positive voltage source, while the source terminal of the first field effect transistor 32 is connected to the stator winding 20. Similarly, the drain terminal of the second field effect transistor 33 is connected to the stator winding 21, while the source terminal of the second field effect transistor 33 is connected to ground potential.

In response to electrical signals received from the phase control circuit 40, the gate driver circuit 31 selectively generates electrical signals to the gate terminals of the first and second field effect transistors 32 and 33 so as to cause the transistors 32 and 33 to operate as either short circuits or open circuits. When both of the transistors 32 and 33 are operated as short circuits, a closed electrical circuit is created between the source of positive voltage through the stator windings 20 and 21 to ground potential. In this manner, electrical current is supplied to the stator windings 20 and 21, causing rotation of the rotor 13 relative to the stator 11 as described above. Flyback diodes 34 and 35 are provided for absorbing electrical transients generated by operation of the field effect transistors 32 and 33. In a manner which will be described in detail below, the first field effect transistor 32 is usually operated for hysteresis control of the energized stator windings 20 and 21, while the second field effect transistor 33 is usually operated for commutation control of such stator windings 20 and 21. Similar phase winding power circuits (not shown) are provided for the other pairs of stator windings 22 and 23, 24 and 25, and 26 and 27.

Figure 5:
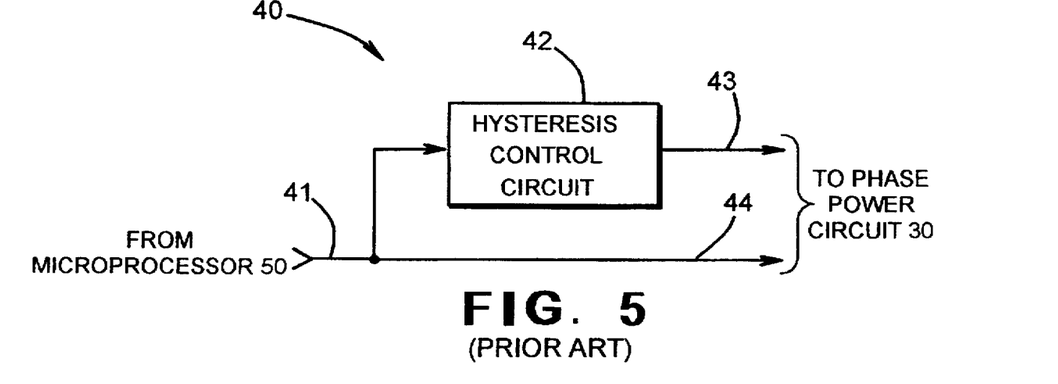
FIG. 5 is a schematic diagram of a prior art structure for one of the phase control circuits of the electronic control circuit illustrated in FIG. 3.

FIG. 5 illustrates a prior art structure for the phase control circuit 40 connected to the phase winding power circuit 30 illustrated in FIG. 4. As shown therein, the phase control circuit 40 includes an input line 41 which is connected to an output port of the microprocessor 50. The input line 41 is connected to an input of a hysteresis control circuit 42. The hysteresis control circuit 42 is conventional in the art and is adapted to generate an output signal on a first output line 43 whenever a high or logical "1" signal is present on the input line 41. The output signal from the hysteresis control circuit 42 is preferably maintained initially at a high state for a predetermined period of time, then is caused to rapidly oscillate between a high and a low or logical "0" signal. The purpose for this signal generation will be explained below. The input line 41 to the phase control circuit 40 is also connected to a second output line 44. The first and second output lines 43 and 44 are connected to respective inputs of the gate driver circuit 31 of the phase winding power circuit 30.

When the microprocessor 50 generates a high signal on the input line 41 to the phase control circuit 40, the hysteresis control circuit 42 initially generates a high signal on the first output line 43 to the first input of the gate driver circuit 31 of the phase winding power circuit 30. In response thereto, the first field effect transistor 32 is operated in a short circuit condition. At the same time, a high signal is generated on the second output line 44 to the second input of the gate driver circuit 31. In response thereto, the second field effect transistor 33 is operated in a short circuit condition. As a result, electrical current rapidly flows through the stator windings 20 and 21, increasing at a rapid rate. After a predetermined period of time, however, the hysteresis control circuit 42 generates an output signal which rapidly oscillates between the high signal and a low signal, causing the first field effect transistor 32 to be rapidly operated in between the short circuit condition and the open circuit condition. This pulse modulation is effective to limit the magnitude of the electrical current passing through the stator windings 20 and 21 to a predetermined maximum value. In this manner, the stator windings 20 and 21 of the first phase of the motor 10 are energized for operation, as described above.

When it is time to energized the stator windings 22 and 23 of the second phase of the motor 10, the microprocessor 50 generates a low signal on the input line 41 to the phase control circuit 40. In response thereto, the hysteresis control circuit 42 generates a low signal on both the first and second output lines 43 and 44 to the gate driver circuit 31 of the phase winding power circuit 30. In response thereto, the first and second field effect transistors 32 and 33 are operated in an open circuit condition. As a result, the flow of electrical current through the stator windings 20 and 21 is interrupted, and the first phase of the motor 10 is de-energized. The stator windings 22 and 23 of the second phase of the motor 10 are energized in the same manner, however, to continue to cause the rotor 13 to rotate relative to the stator 11.

As discussed above, it is desirable that the current pulses generated to a first pair of stator windings on a particular one of the stator poles 12 be gradually decreased as the current pulses generated to the second pair of windings 22 and 23 are gradually increased. To permit a smooth transition of a rotor pole 14 past an attracting stator pole 12 and, therefore, promote rotation of the rotor 13 at a relatively constant speed, the timing of commutation (i.e., the switching of the electrical current from a first phase of the motor 10 to a second phase) in response to the precise rotational position of the rotor 13 relative to the stator 11 is an important aspect of operating the motor 10 in an efficient manner. In the prior art electronic control circuit described above, the microprocessor 50 generated the commutation signals to the phase control circuits 40 in response to rotor positions signals generated by either external or internal rotor position sensing devices of the prior art. However, as discussed above, known rotor position sensing mechanisms have been found to have various drawbacks.

Figure 6:
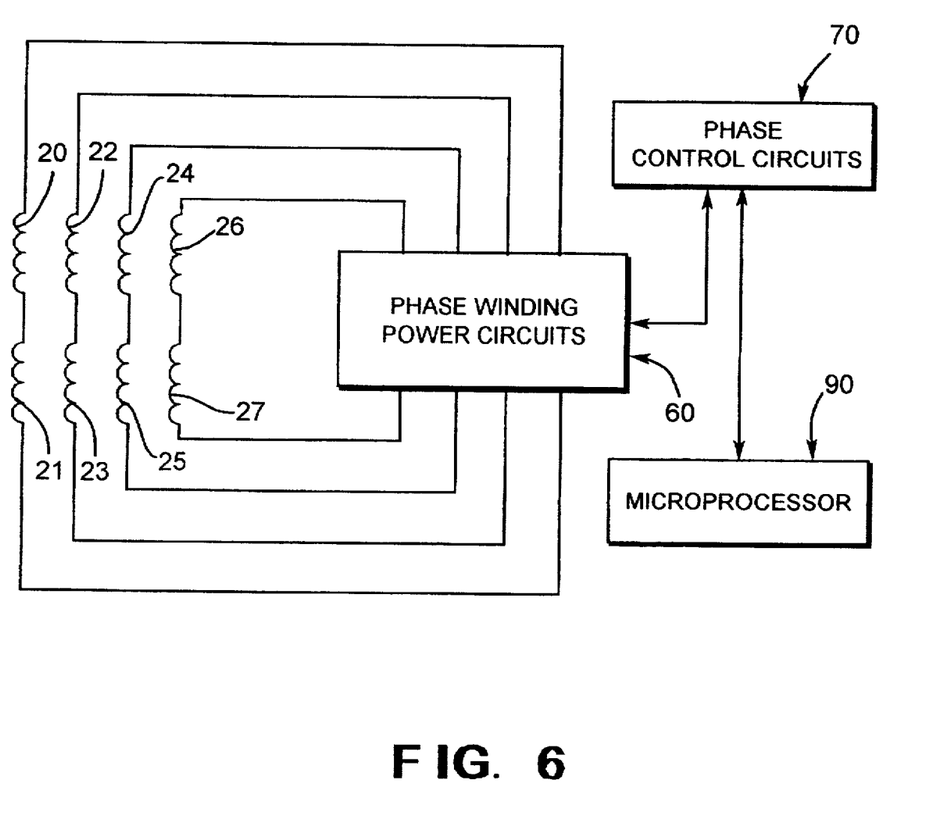
FIG. 6 is a schematic diagram of a structure for an electronic control circuit in accordance with this invention shown connected to all of the stator windings of the variable reluctance electric motor illustrated in FIGS. 1 and 2.

Referring now to FIG. 6, there is illustrated a schematic diagram of an improved structure for an electronic control circuit in accordance with this shown for operating the variable reluctance electric motor illustrated in FIGS. 1 and 2. The electronic control circuit a plurality of individual phase winding power circuits, which are indicated generally in a single block at 60. Preferably, an individual phase winding power circuit 60 is provided for each phase of operation of the electric motor 10. Each of the phase winding power circuits 60 is adapted to selectively generate pulses of electrical current through a selected one of the pairs of stator windings 20 and 21, 22 and 23, 24 and 25, and 26 and 27 in the general manner described above so as to cause the rotor 13 to rotate relative to the stator 11. The structure and operation of the phase winding power circuits 60 will be described in detail below.

The timing, magnitude, and polarity of the electrical current pulses generated by the phase winding power circuits 60 are determined, at least in part, by the rotational position of the rotor 13 relative to the stator 11. To accomplish this, a plurality of phase control circuits, indicated generally in a single block at 70, is provided. The structure and operation of the phase control circuits 70 will also be described in detail below. The phase winding power circuits 60 are responsive to electrical signals generated by the phase control circuits 70 for controlling the timing and magnitude of the current pulses generated to the various pairs of stator windings 20 through 27 of the motor 10, similar to that described above. Finally, the electronic control circuit includes an electronic controller, such as a microprocessor 90 or other computational mechanism. The microprocessor 90 generates electrical signals to the phase control circuit 70 to control the operation thereof and, therefore, the timing, magnitude, and polarity of the electrical current pulses generated by the phase winding power circuits 60. The microprocessor 90 may be embodied as any commercially available microprocessor which is programmed to function in the manner described below.

Figure 7:
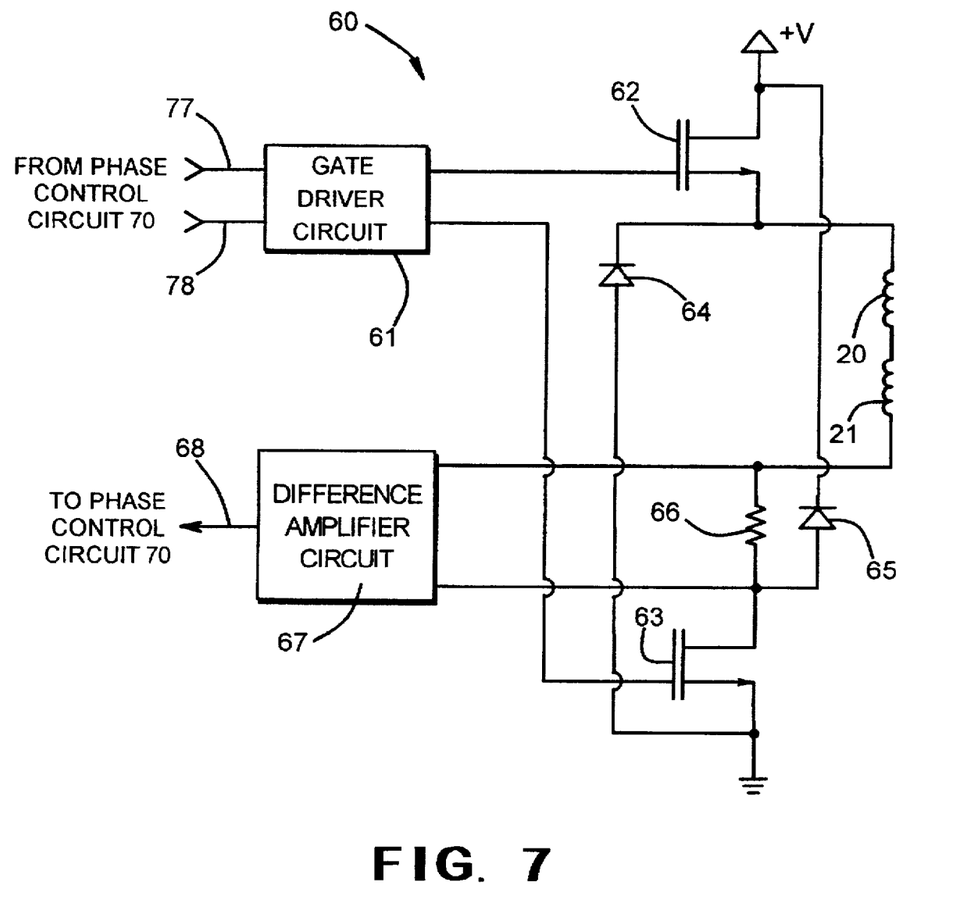
FIG. 7 is a schematic diagram of a structure for one of the phase winding power circuits of the electronic control circuit illustrated in FIG. 6 in accordance with this invention.

FIG. 7 illustrates the phase winding power circuit 60 connected to the first pair of stator windings 20 and 21. As shown therein, the first phase winding power circuit 60 includes a gate driver circuit 61 which receives input signals from the phase control circuit 70. The gate driver circuit 61 is conventional in the art and is adapted to generate electrical signals to operate first and second electronic switches, such as field effect transistors 62 and 63. In the illustrated embodiment, the gate driver circuit 61 is connected to the gate terminals of the first and second field effect transistors 62 and 63. The drain terminal of the first field effect transistor 62 is connected to a source of positive voltage, while the source terminal of the first field effect transistor 62 is connected to the stator winding 20. Similarly, the drain terminal of the second field effect transistor 63 is connected to the stator winding 21, while the source terminal of the second field effect transistor 63 is connected to ground potential.

The first phase winding power circuit 60 further includes a current sensing resistor 66 which is connected in series between the stator winding 21 and the drain terminal of the second field effect transistor 63. As is well known, when an electrical current is passed through a resistive element, a voltage potential is generated thereacross which is directly proportional to the magnitude of the electrical current. Thus, a voltage potential is generated across the sensing resistor 66 which is proportional to the magnitude of the electrical current being passed through the stator windings 20 and 21. A difference amplifier circuit 67 is connected across the sensing resistor 66. The difference amplifier circuit 67 is conventional in the art and is responsive to the magnitude of the voltage potential across the sensing resistor 66 for generating an output signal on an output line 68 which is representative of the magnitude of the electrical current being passed through the stator windings 20 and 21. The output signal from the difference amplifier circuit 67 is fed back to the phase control circuit 70. Similar phase winding power circuits 60 (not shown) are provided for the other pairs of stator windings 22 and 23, 24 and 25, and 26 and 27. All of such phase winding power circuits 60 operate substantially as described above in connection with the prior art phase winding power circuit 30, except for the additional phase current magnitude signal generated on the output line 68 by the difference amplifier circuit 67.

Figure 8:
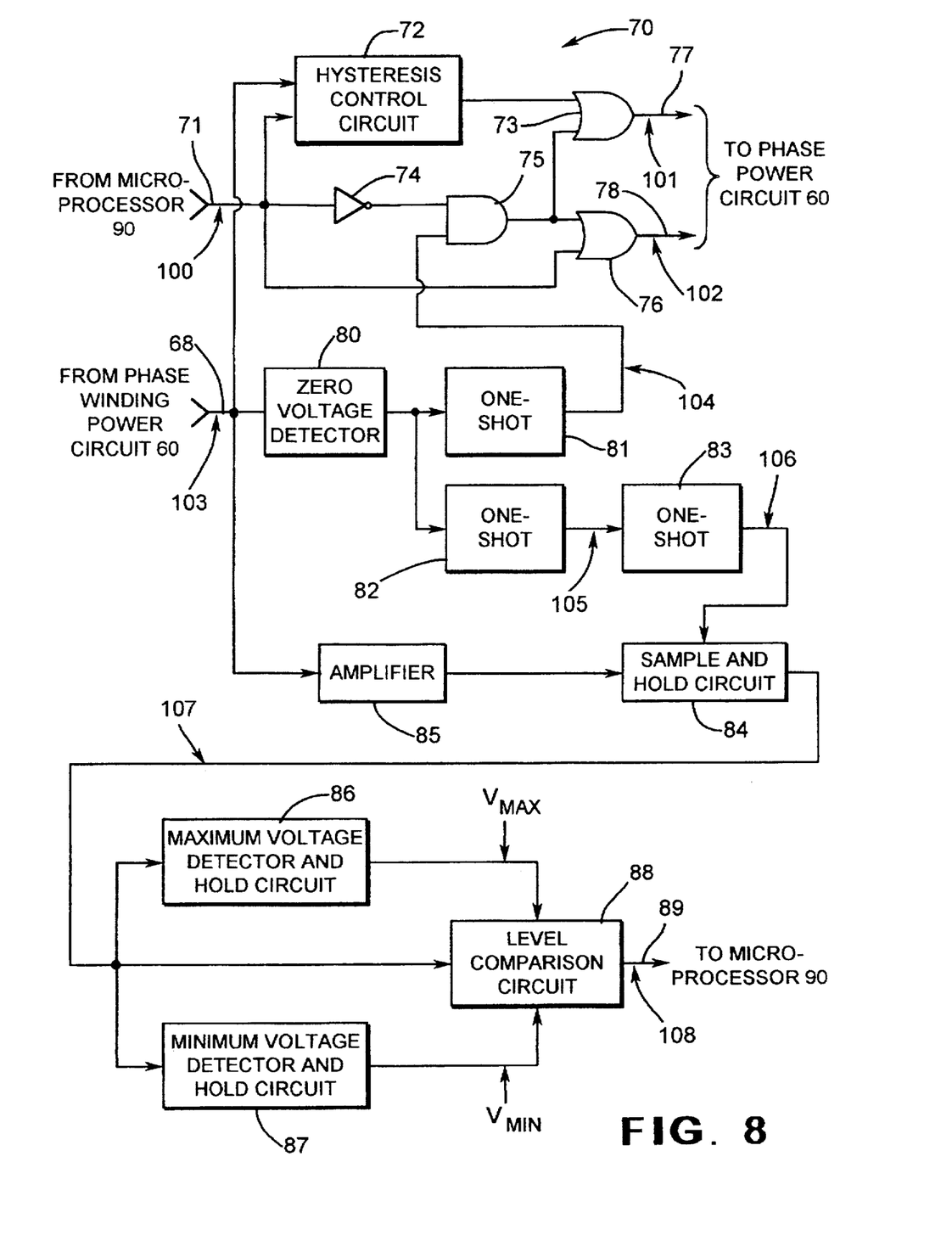
FIG. 8 is a schematic diagram of a structure for one of the phase control circuits of the electronic control circuit illustrated in FIG. 6 in accordance with this invention.

FIG. 8 illustrates the structure for the phase control circuit 70 connected to the phase winding power circuit 60 illustrated in FIG. 3. As shown therein, the phase control circuit 70 includes an input line 71 which is connected to an output port of the microprocessor 90. The input line 71 is connected to a first input of a hysteresis control circuit 72, which is similar in structure and operation to the hysteresis control circuit 42 discussed above. The phase current magnitude signal generated on the output line 68 by the difference amplifier circuit 67 is fed to a second input of the hysteresis control circuit 72 for the purpose of phase current control, as is known in the art. The hysteresis control circuit 72 generates an output signal on a line to a first input of a first logical "OR" gate 73. The input line 71 to the phase control circuit 70 is also connected through a logical inverter 74 to a first input of a logical "AND" gate 75. The output of the "AND" gate is connected to a second input of the first "OR" gate 73 and to a first input of a second logical "OR" gate 76. The input line 71 to the phase control circuit 70 is also connected directly to a second input of the second "OR" gate 76. An output of the first "OR" gate 73 is connected to a first output line 77, while an output of the second "OR" gate 76 is connected to a second output line 78. The first and second output lines 77 and 78 are connected to respective inputs of the gate driver circuit 61 of the phase winding power circuit 60.

The phase current magnitude signal generated on the output line 68 by the difference amplifier circuit 67 is also fed to an input of a zero voltage detector circuit 80. The zero voltage detector circuit 80 is conventional in the art and is adapted to generate an output signal whenever the magnitude of the phase current passed through the stator windings 20 and 21 (as represented by the signal on the line 68) is zero. The output signal from the zero voltage detector circuit 80 is fed to the input of a first monostable multivibrator circuit, commonly referred to as a "one-shot" circuit 81.

One-shot circuits are conventional in the art and are adapted to generate a single output pulse of predetermined time duration in response to the presence of an input signal. Thus, when a signal is generated by the zero voltage detector circuit 80, the first one-shot circuit 81 generates an output signal of predetermined time duration to a second input of the "AND" gate 75.

The output signal from the zero voltage detector circuit 80 is also fed to the input of a second one-shot circuit 82. For a reason which will be explained below, the predetermined time duration of the output signal from the second one-shot circuit 82 is less than the predetermined time duration of the output signal from the first one-shot circuit 81. The output of the second one-shot circuit 82 is fed to the input of a third one-shot circuit 83. For a reason which will also be explained below, the predetermined time duration of the output signal from the third one-shot circuit 83 is approximately equal to the predetermined time duration of the output signal from the first one-shot circuit 81 less the predetermined time duration of the output signal from the second one-shot circuit 82. In other words, the predetermined time duration of the output signal from the first one-shot circuit 81 is approximately equal to the sum of the predetermined time durations of the output signals from the second and third one-shot circuits 82 and 83. The output of the third one-shot circuit 83 is fed to a trigger input of a sample and hold circuit 84. The operation of the sample and hold circuit 84 will be explained below.

The phase current magnitude signal generated on the output line 68 by the difference amplifier circuit 67 is also fed through a conventional amplifier circuit 85 to a signal input of the sample and hold circuit 84. The sample and hold circuit 84 is conventional in the art and is adapted to acquire and retain a signal which is present at the signal input when a signal is received at the trigger input. Thus, when an output signal is generated from the third one-shot circuit 83 to the trigger input, the sample and hold circuit 84 will acquire the signal which is present at that time at the signal input thereof and generate a constant output signal which is equal in magnitude to the acquired signal. The sample and hold circuit 84 will continue to generate that same output signal until the next output signal from the third one-shot circuit 83 is received at the trigger input.

The output signal from the sample and hold circuit 84 is fed to an input of a maximum voltage detector and hold circuit 86. The maximum voltage detector and hold circuit 86 is conventional in the art and is adapted to generate a constant output signal having a magnitude which is equal to the maximum magnitude of the output signal from the sample and hold circuit 84. Similarly, the output signal from the sample and hold circuit 84 is also fed to an input of a minimum voltage detector and hold circuit 87. The minimum voltage detector and hold circuit 87 is also conventional in the art and is adapted to generate a constant output signal having a magnitude which is equal to the minimum magnitude of the output signal from the sample and hold circuit 84. The maximum and minimum level signals from the maximum and minimum voltage detector and hold circuits 86 and 87, respectively, are fed to a level comparison circuit 88, as is the output signal from the sample and hold circuit 84. The level comparison circuit 88 is conventional in the art and is adapted to generate an output signal whenever the output signal from the sample and hold circuit 84 either exceeds a threshold level. The threshold level is generated internally in the level comparison circuit 88 based upon the maximum and minimum signals provided by maximum and minimum voltage detector and hold circuits 86 and 87. For example, the threshold level may be generated by a simple resistive voltage divider network connected between the maximum and minimum voltage detector and hold circuits 86 and 87. The output signal from the level comparison circuit 88 is fed on a line 89 to the microprocessor 90.

The operation of the electronic control circuit of this invention will now be explained in conjunction with the timing chart illustrated in FIG. 9. As mentioned above, the timing chart illustrates a number of signals which are generated by the various components of the phase winding power circuit 60 and the phase control circuit 70 illustrated in FIGS. 7 and 8. Thus, while the timing chart illustrates the operation of only one of the phases of the motor 10, it will be appreciated that the other phases of the motor 10 can be operated in the same manner.

Figure 9:
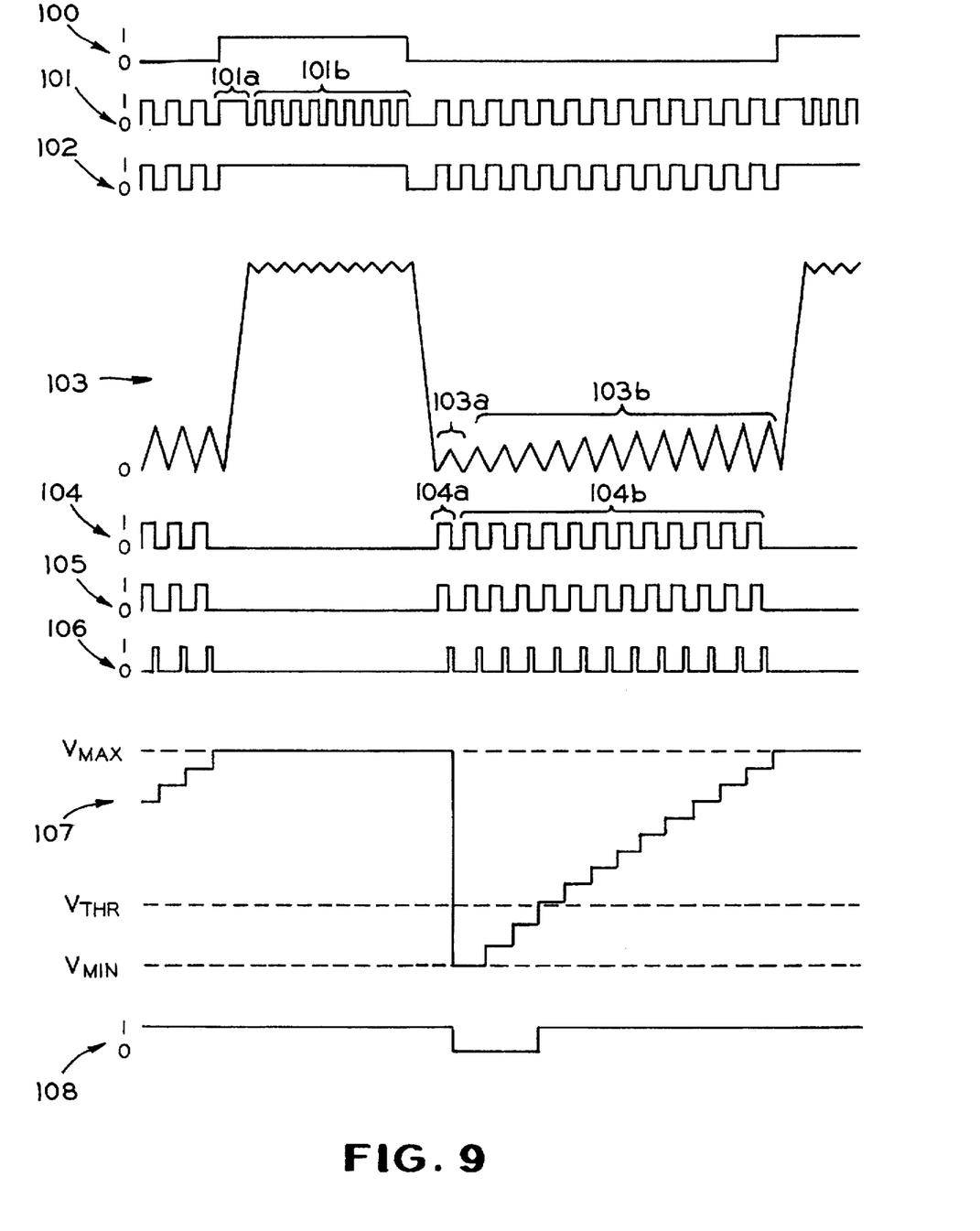
FIG. 9 is a timing chart which illustrates a number of signals generated by the various components of the phase winding power circuit and the phase control circuit illustrated in FIGS. 7 and 8.

The energization of the first pair of stator windings 20 and 21 is initiated by a high signal from the microprocessor 90 on the input line 71 to the phase control circuit 70, as shown at waveform 100 in FIG. 9. When this occurs, the hysteresis control circuit 72 and the various logical components 73 through 76 function to generate the waveforms 101 and 102 on the first and second output lines 77 and 78, respectively. As alluded to earlier, the signal from the hysteresis control circuit 72 on the output line 77 is preferably maintained initially at a high state for a predetermined period of time (see pulse 101a of waveform 101), then is caused to rapidly oscillate between a high signal and a low signal (see pulses 101b). The signal on the output line 78 essentially mirrors the input signal from the microprocessor 90, transitioning from a low state to a high state until the signal from the microprocessor 90 on the input line 71 returns to a low state.

The first and second output lines 77 and 78 are connected to the inputs of the gate driver circuit 61 which, in turn, is connected to the first and second field effect transistors 62 and 63. As a result of these signals, the first field effect transistor 62 is caused to oscillate between closed (during the high signal) and opened (during the low signal) conditions, while the second field effect transistor 63 is caused to remain in the closed condition. Whenever both of the field effect transistors 62 and 63 are in the closed condition, a closed electrical circuit is formed between the source of positive voltage, the stator windings 20 and 21, and ground potential. Consequently, the stator windings 20 and 21 are energized as described above to cause the rotor 13 to rotate relative to the stator 11.

The energization of the stator windings 20 and 21 is graphically represented by the waveform 103 in FIG. 9, which illustrates the voltage across the sensing resistor 66. Because of the relatively long time duration of the initial pulse 101a from the hysteresis control circuit 72, the magnitude of this phase energization current initially rises very rapidly. After a predetermined period of time, which is preferably reached when the magnitude of the phase energization current achieves an optimum value, the shorter subsequent pulses 101b causes the phase energization current to remain relatively constant for the duration of that energization of the stator windings 20 and 21.

At some point, however, after the rotor 13 has rotated a sufficient distance relative to the stator 11, it is desirable to discontinue the phase energization current through the stator windings 20 and 21 and energize the stator windings 22 and 23 of the next phase of the motor 10. The rotational position of the rotor 13 relative to the stator 11, and thus the determination of the point of commutation of the motor 10 from one phase to another, is determined after the phase energization current to the stator windings 20 and 21 is discontinued.

When the signal from the microprocessor 90 is discontinued, the hysteresis control circuit 72 is disabled from generating the oscillating signals 101a and 101b. Consequently, the signals on the output lines 77 and 78 transition to low signals as shown in waveforms 101 and 102. In response thereto, the first and second field effect transistors 62 and 63 are opened, and the magnitude of the phase energization current through the stator windings 20 and 21 (as represented by the voltage across the sensing resistor 66) decreases rapidly, as shown in the waveform 103. As discussed above, the magnitude of the phase energization current through the stator windings 20 and 21 is fed over the output line 68 from the difference amplifier 67 of the phase winding power circuit 60 to the zero voltage detector 80 of the phase control circuit 70.

When the magnitude of the phase energization current through the stator windings 20 and 21 decreases to zero, the zero voltage detector 80 generates a high output signal to the first one-shot circuit 81. The initial output pulse 104a from the first one-shot circuit 81, as illustrated as waveform 104 in FIG. 9, is fed to the second input of the "AND" gate 75. Inasmuch as the signal present at the first input of the "AND" gate 75 is already a high output signal (the low output signal from the microprocessor 90 inverted through the logical inverter 74), the "AND" gate generates a high output signal to the first and second "OR" gates 73 and 76. As a result, high output pulses of a predetermined time duration (determined by the time constant of the first one-shot circuit 81) are generated on both of the output lines 77 and 78. This causes the first and second field effect switches 62 and 63 to briefly be operated in the closed condition, allowing electrical current to flow through the stator windings 20 and 21 (see 103a of waveform 103). However, before the magnitude of this electrical current rises to a level where it can significantly affect the rotation of the rotor 13, the initial output pulse 104a from the first one-shot circuit 81 terminates. Thereafter, the field effect transistors 62 and 63 are operated in the opened condition, and the magnitude of the electrical current passing through the stator windings 20 and 21 again decreases to zero. When it reaches zero, it again triggers a high output signal from the first one-shot circuit 81, and the above-described sequence of events repeats. Thus, a series of output pulses 104b are generated by the first one-shot circuit 81, each having the same predetermined time duration as the initial output pulse 104a.

As a result, as shown in waveform 103, a series of relatively small magnitude current pulses 103a and 103b are caused to flow through the stator windings 20 and 21. The rate of increase for each of these relatively small magnitude current pulses 103a and 103b is proportional to the magnitude of the inductance of the electrical circuit containing the stator windings 20 and 21. Inductance is a characteristic of an electrical circuit which can be generally defined as a property of that circuit which resists changes in the magnitude of current flowing therethrough. As inductance in an electrical circuit decreases, the ability of the current flowing therethrough to change increases. Conversely, as inductance in an electrical circuit increases, the ability of the current flowing therethrough to change decreases.

In the illustrated embodiment, the inductance of the circuit containing the stator windings 20 and 21 varies with the rotational position of the rotor 13 relative to the stator 11. As discussed above, when the rotor poles 14 are aligned with the stator poles 12 (such as rotor poles X1 and X2 with stator poles A1 and A2 in FIG. 2) they are located in a position of minimum reluctance. In this position, a maximum inductance is induced in the electrical circuit containing the stator windings 20 and 21. Conversely, when the rotor poles 14 are misaligned with the stator poles 12 (such as rotor poles Y1 and Y2 with stator poles C1 and C2 in FIG. 2) they are located in a position of maximum reluctance, and a minimum inductance is induced in the electrical circuit containing the stator windings on those stator poles 12.

Accordingly, after the relatively large phase energization current supplied to the stator windings 20 and 21 of the motor 10 has been discontinued, the rotor poles 14 (which were attracted to the stator poles 12 during such energization) rotate past the stator poles 12 from a position of maximum inductance (rotor poles 14 aligned with stator poles 12) to a position of minimum inductance (rotor poles 14 not aligned with stator poles 12). As the inductance in the electrical circuit containing the stator windings 20 and 21 decreases, the rate of increase for each of the relatively small magnitude current pulses passed therethrough as described above increases. Thus, as shown by the dotted lines in waveform 103, the subsequently generated pulses 103b of electrical current passing through the stator windings 20 and 21 become successively larger in relationship with the rotational position of the rotor 13 relative to the stator 11. This relationship is used by the electronic control circuit of this invention to control commutation of the motor 10.

To accomplish this, the output signal from the zero voltage detector 80 is also fed to the input of the second one-shot circuit 82. In response thereto, the second one-shot circuit 82 generates an output pulse (waveform 105) to the input of the third one-shot circuit 83. At the conclusion of the output pulse from the second one-shot circuit 82, the third one-shot circuit 83 generates an output pulse (waveform 106) to the trigger input of the sample and hold circuit 84. The relationship between the waveforms 103, 104, 105, and 106 is illustrated more clearly in FIG. 10. As shown therein, the output pulses from the first one-shot circuit 81 define a time duration $T_1$, the output pulses from the second one-shot circuit 82 define a time duration $T_2$, and the output pulses from the third one-shot circuit 83 define a time duration $T_3$. The time duration $T_2$ of the output pulse from the second one-shot circuit 82 is slightly shorter than the time duration $T_1$ of the output pulse from the first one-shot circuit 81. As a result, the output pulse from the third one-shot circuit 83 is initiated slightly before the magnitude of the electrical current passing through the stator windings 20 and 21 reaches a maximum value having a predetermined time duration $T_2$. As discussed above, the phase current magnitude signal generated on the output line 68 by the difference amplifier circuit 67 is fed through the amplifier circuit 85 to the signal input of the sample and hold circuit 84. Therefore, when the output pulse from the third one-shot circuit 83 is initiated, the magnitude of the electrical current passing through the stator windings 20 and 21 is sampled by the sample and hold circuit 84. The output signal from the sample and hold circuit is illustrated as waveform 107 in FIG. 9.

In this manner, a series of samples of the magnitude of the electrical current passing through the stator windings 20 and 21 is obtained by the sample and hold circuit 84. As previously discussed, the pulses of electrical current 103a and 103b passing through the stator windings 20 and 21 become successively larger in relationship with the rotational position of the rotor 13 relative to the stator 11. The output signal from the sample and hold circuit 84 will increase in a step-like manner in response thereto, as shown in waveform 107. This output signal is fed to the level comparison circuit 88, where it is compared with an internally generated threshold voltage $V_{THR}$. This threshold voltage $V_{THR}$ is representative of a predetermined relative rotor position wherein it is desirable to commutate the motor 11. Thus, when the output signal from the sample and hold circuit 84 increases above the threshold voltage $V_{THR}$, the output from the sample and hold circuit 84 will transition from low to high, as shown in waveform 108. This transition signal is fed over the line 89 to the microprocessor 90. In response thereto, the microprocessor 90 is responsive to this transition signal for generating a high signal over the line 71 to the electronic control circuit of the next phase of the motor 11 to be energized.

In summary, commutation control of the motor 11 is accomplished by initially generating relatively small pulses of electrical current to the non-energized stator windings 20 and 21 of the motor 11. As the rotor 13 rotates relative to the stator 11, the inductance induced in such stator windings 20 and 21 will vary. As a result, the magnitude of the current pulses in the stator windings 20 and 21 will increase over time. When the magnitude of such current pulses exceeds a predetermined level which corresponds to a predetermined rotational position of the rotor relative to the stator, a signal is generated on the line 89 to cause commutation of the motor 11.

Figure 10:
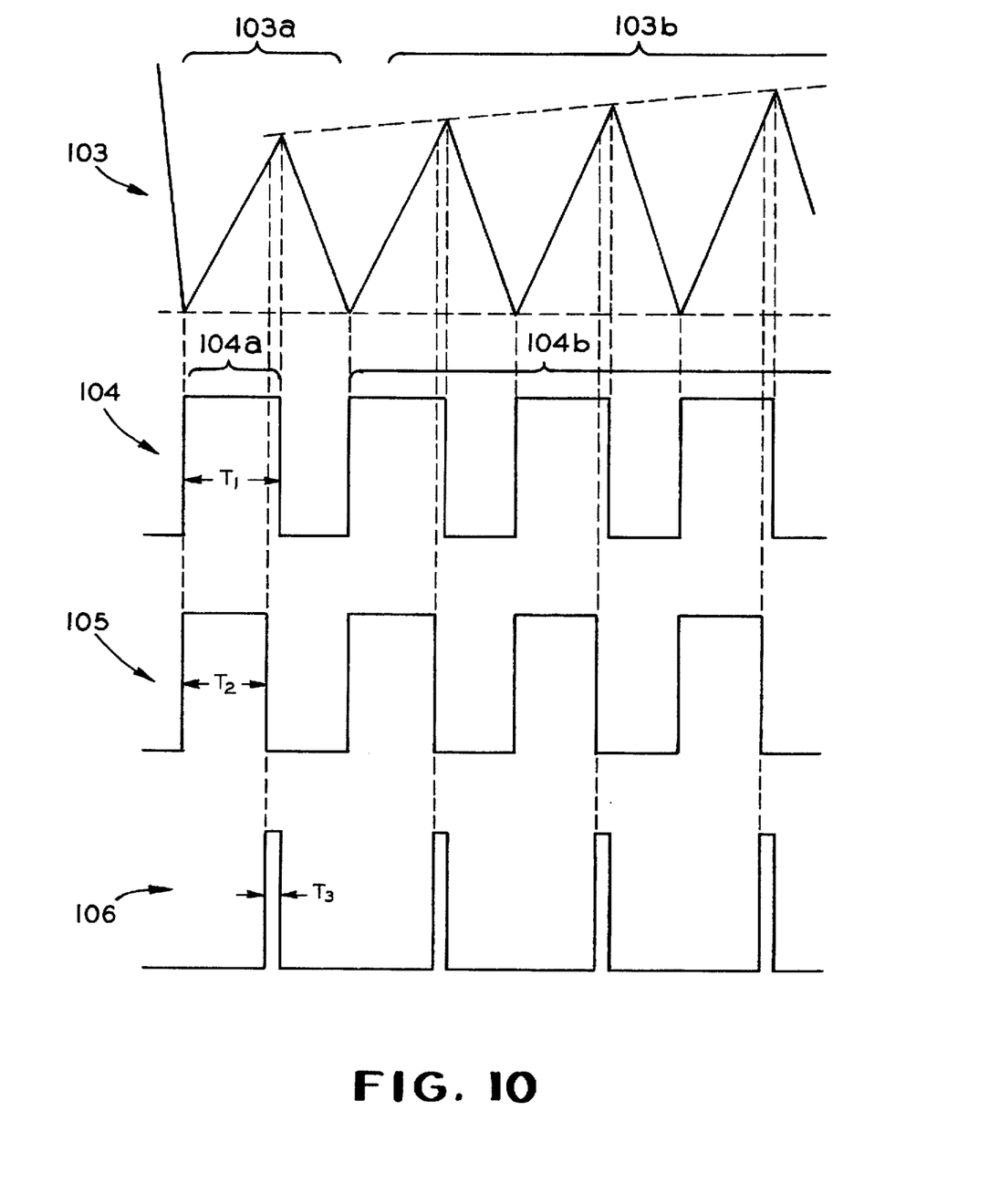
FIG. 10 is an enlarged portion of the timing chart illustrated in FIG. 9.

As shown in FIGS. 9 and 10, the magnitude of the current pulses generated in the stator windings 20 and 21 oscillates in a ramp-like manner between a minimum value (when the pulse 104a is initially generated) and a maximum value (when the pulse 104a is terminated). Ideally, the minimum and maximum values of the waveform 104 are identical each time the relatively small pulses of electrical current are supplied to the non-energized stator windings of the motor 11. However, it has been found that this ideal situation does not occur in actual practice. Rather, variations in the inductances of the pairs of stator windings have been found to occur from one phase of the motor 10 to another, and further from one motor 10 to another. This variations are caused by several factors, including changes in stator winding parameters and operating temperature.

To address these changes, the maximum and minimum voltage detector and hold circuits 86 and 87, respectively, are provided. As discussed above, the output signal from the sample and hold circuit 84 is fed to the inputs of the maximum and minimum voltage detector and hold circuits 86 and 87, respectively. The maximum voltage detector and hold circuit 86 generates a constant output signal $V_{MAX}$ having a magnitude which is equal to the maximum magnitude of the output signal from the sample and hold circuit 84, while the minimum voltage detector and hold circuit 87 generates a constant output signal $V_{MIN}$ having a magnitude which is equal to the minimum magnitude of the output signal from the sample and hold circuit 84. It has been found that although the magnitudes of these maximum and minimum voltage levels may vary with operation of the motor 10, the difference therebetween remains relatively constant. Thus, by generating the threshold level $V_{THR}$ as a function of the maximum and minimum signals $V_{MAX}$ and $V_{MIN}$, compensation is made these variations. For example, as mentioned above, the threshold level $V_{THR}$ may be generated by a simple resistive voltage divider network connected between the maximum and minimum signals $V_{MAX}$ and $V_{MIN}$ signals. As a result, the measured rotational position of the rotor 13 relative to the stator 11, and thus, the commutation of the motor 10, will be adjusted automatically to compensate for inductance variances in the stator windings.

In accordance with the provisions of the patent statutes, the principle and mode of operation of this invention have been explained and illustrated in its preferred embodiment.

However, it must be understood that this invention may be practiced otherwise than as specifically explained and illustrated without departing from its spirit or scope.

What is claimed is:

1. An electric motor comprising:
   a stator having first and second stator poles;
   a rotor supported within said stator for relative rotational movement and having first and second rotor poles;
   first and second stator windings of an electrical conductor disposed respectively about said first and second stator poles;
   means for connecting said first stator winding with a source of electrical energy so as to cause a relatively large amount of electrical current to flow therethrough and thereby urge said rotor to rotate relative to said stator;
   means for connecting said second stator winding with a source of electrical energy so as to cause a relatively small amount of electrical current to flow therethrough;
   a logic circuit responsive to said relatively small amount of electrical current flowing through said second stator winding for generating a signal when said relatively small amount of electrical current exceeds a predetermined value; and
   a control circuit responsive to said logic circuit signal for discontinuing the supply of electrical current to said first stator winding.

2. The electric motor defined in claim 1 wherein said logic circuit includes a detector for generating a signal when said relatively large amount of current flowing through said first stator winding decreases to a predetermined magnitude, said means for connecting said second stator winding with a source of electrical energy being activated in response to said detector signal.

3. The electric motor defined in claim 2 wherein said detector is a zero voltage detector for generating a signal when said relatively large amount of current flowing through said first stator winding decreases to zero.

4. The electric motor defined in claim wherein said detector signal has a predetermined time duration so as to cause a relatively small amount of electrical current to flow through said second stator winding.

5. The electric motor defined in claim 2 wherein said logic circuit further includes a sample and hold circuit which is activated in response to said detector signal, said sample and hold circuit generating an output signal which is representative of the magnitude of said relatively small amount of electrical current flowing through said second stator winding when said detector signal is generated.

6. The electric motor defined in claim 5 wherein said logic circuit further includes a level comparison circuit which is responsive to said output signal from said sample and hold circuit for generating said logic circuit signal when said output signal from said sample and hold circuit exceeds a threshold level.

7. The electric motor defined in claim 6 wherein said logic circuit further includes means responsive to said output signal from said sample and hold circuit for varying said threshold signal.

8. The electric motor defined in claim 7 wherein said means for varying said threshold signal includes means for generating a signal which is representative of the maximum magnitude of said output signal from said sample and hold circuit, means for generating a signal which is representative of the minimum magnitude of said output signal from said sample and hold circuit, and means responsive to said maximum and minimum signals for generating said threshold signal.

9. An electric motor comprising:
   a stator having first and second stator poles;
   a rotor supported within said stator for relative rotational movement and having first and second rotor poles;
   first and second stator windings of an electrical conductor disposed respectively about said first and second stator poles;
   means for connected said first stator winding with a source of electrical energy so as to cause a relatively large amount of electrical current to flow therethrough and thereby urge said rotor to rotate relative to said stator;
   means for connecting said second stator winding with a source of electrical energy so as to cause a relatively small amount of electrical current to flow therethrough;
   means responsive to said relatively small amount of electrical current flowing through said second stator winding for generating an output signal when said relatively small amount of electrical current exceeds a threshold value;
   means responsive to variations in said relatively small amount of electrical current flowing through said second stator winding for varying said threshold value; and
   a control circuit responsive to said output signal for discontinuing the supply of electrical current to said first winding.

10. The electric motor defined in claim 9 wherein said means responsive to said relatively small amount of electrical current flowing through said second stator winding for generating said output signal includes a detector for generating a signal when said relatively large amount of current flowing through said first stator winding decreases to a predetermined magnitude, said means for connecting said second stator winding with a source of electrical energy being activated in response to said detector signal.

11. The electric motor defined in claim 10 wherein said means for connecting said second stator winding with a source of electrical energy is activated in response to said detector signal.

12. The electric motor defined in claim 11 wherein said detector signal has a predetermined time duration so as to cause a relatively small amount of electrical current to flow through said second stator winding.

13. The electric motor defined in claim 10 wherein said means responsive to said relatively small amount of electrical current flowing through said second stator winding for generating said output signal further includes a sample and hold circuit which is activated in response to said detector signal, said sample and hold circuit generating an output signal which is representative of the magnitude of said relatively small amount of electrical current flowing through said second stator winding when said detector signal is generated.

14. The electric motor defined in claim 13 wherein said means responsive to said relatively small amount of electrical current flowing through said second stator winding for generating said output signal further includes a level comparison circuit which is responsive to said output signal from said sample and hold circuit for generating said logic circuit signal when said output signal from said sample and hold circuit exceeds said threshold level.

15. The electric motor defined in claim 14 wherein said means responsive to variations in said relatively small amount of electrical current flowing through said second stator winding for varying said threshold value is responsive to said output signal from said sample and hold circuit for varying said threshold signal.

16. The electric motor defined in claim 15 wherein said means for varying said threshold signal includes means for generating a signal which is representative of the maximum magnitude of said output signal from said sample and hold circuit, means for generating a signal which is representative of the minimum magnitude of said output signal from said sample and hold circuit, and means responsive to said maximum and minimum signals for generating said threshold signal.

17. A variable reluctance electric motor comprising:

a stator including a plurality of radially inwardly extending stator poles formed from a magnetically permeable material and arranged in opposed pairs;

a rotor supported within said stator for relative rotational movement and including a plurality of radially outwardly extending rotor poles, said rotor being formed from a magnetically permeable material, a magnetic reluctance being defined between said rotor poles and said stator poles which varies between a minimum reluctance when said rotor poles are radially aligned with said stator poles and a maximum reluctance when said rotor poles are not radially aligned with said stator poles, an inductance being defined between said rotor poles and said stator poles which varies between a maximum inductance when said rotor poles are radially aligned with said stator poles and a minimum inductance when said rotor poles are not radially aligned with said stator poles;

a plurality of stator windings of an electrical conductor disposed respectively about each said stator poles, said stator windings of each of said opposed pairs being connected together in pairs to define a plurality of phases of operation for the motor;

means for connecting a first pair of said stator windings with a source of electrical energy so as to cause a relatively large amount of electrical current to flow therethrough and thereby urge said rotor to rotate relative to said stator;

means for connecting a second pair of said stator windings with a source of electrical energy so as to cause a relatively small amount of electrical current to flow therethrough;

a logic circuit responsive to said relatively small amount of electrical current flowing through said second pair of stator windings for generating a signal when said relatively small amount of electrical current exceeds a predetermined value; and a control circuit responsive to said logic circuit signal for discontinuing the supply of electrical current to said first pair of stator windings.

* * * * *

UNITED STATES PATENT AND TRADEMARK OFFICE
CERTIFICATE OF CORRECTION

PATENT NO. : 5,783,916
DATED : July 21, 1998
INVENTOR(S) : Scott E. Blackburn

It is certified that error appears in the above-identified patent and that said Letters Patent is hereby corrected as shown below:

Column 15, Claim 4, Line 1, after "claim", insert -- 2 --.

Signed and Sealed this

Sixth Day of October, 1998

Attest:

Attesting Officer

BRUCE LEHMAN
Commissioner of Patents and Trademarks